United States Patent Office 3,392,098
Patented July 9, 1968

3,392,098
CHLORINATION OF HYDROCARBONS
Alfred J. Restaino, Trenton, N.J., and Robert F. Hornbeck, Livermore, Calif., assignors to Atlas Chemical Industries, Inc., Wilmington, Del., a corporation of Delaware
No Drawing. Filed Dec. 7, 1962, Ser. No. 242,915
5 Claims. (Cl. 204—163)

This invention relates to a process for the preparation of chlorinated aliphatic and cycloaliphatic hydrocarbons and more particularly to the radiation induced chlorination of such hydrocarbons.

Chlorinated hydrocarbons are a known and useful group of compounds, being employed as solvents, as components of insecticides and other pesticides, and as starting materials for the synthesis of other compounds. The present invention provides a novel and improved method, employing high energy ionizing radiation for preparing such chlorinated compounds which are of aliphatic or cycloaliphatic nature.

It is known to chlorinate aromatic hydrocarbons under the influence of high energy ionizing radiation. Under exposure to gamma rays benzene chlorinates so rapidly that a diluent such as carbon tetrachloride must be present to slow the reaction and to absorb the heat generated. Even so the chlorination cannot be controlled to yield partially chlorinated benzene, the product always being the hexachloro derivative.

The chlorination of aliphatic hydrocarbons is a known process, usually at high temperatures in the vapor phase and frequently in the presence of catalysts. Such processes encounter the usual problems of high temperature reactions, including particularly that of controlling the temperature to avoid carbonization and to prevent explosions. Photochemical chlorinations have also been described, which reactions may be conducted at only slightly elevated temperatures, but these are difficult to carry out in large scale because of the lack of penetration of visible light into the reaction mass and the considerable absorption of photo-energy by the container walls.

In accordance with the present invention, it has been found that aliphatic and cycloaliphatic hydrocarbons, irradiated with high energy ionizing radiation, react with chlorine at ordinary temperature to form predominantly mono chloro derivatives. For many purposes the relatively minor proportion of formed di- and tri-chloro compounds (higher degree of chlorination has not been detected) may be left in the reaction product without detracting from its usefulness. If purer mono product is desired simple fractional distillation will effect its separation from the reaction mixture.

The high energy ionizing radiation employed in the process of the invention may be electro magnetic or particulate in nature, and includes accelerated electrons, protons, neutrons, etc., as well as X-rays and gamma rays. Preferably, penetrating radiation, i.e., gamma rays or X-rays, is preferred.

In general the process is carried out by exposing the liquid aliphatic or cycloaliphatic hydrocarbon containing dissolved chlorine gas to the high energy radiation to produce chlorinated derivatives of the former. Diluents which do not react with chlorine may be present if desired. The radiation intensity may vary over extremely wide limits. Appreciable rates of conversion are obtained at intensities as low as 10,000 rads per hour and intensities as high as 50 megarads per hour may be employed without harmful effects. A preferred range of radiation intensities is from 0.1 to 30 megarads per hour.

The radiation dosages employed may range from about $5 \times 10^4$ rads to about $10^8$ rads with satisfactory results. A preferred range for the dosage is from $10^5$ to $10^7$ rads.

The process may be carried out batchwise or continuously. In batch operation chlorine gas may, if desired, be bubbled through the liquid to insure a continued supply of dissolved chlorine and to provide agitation of the reaction mixture. In reaction vessels of large volume to surface ratio supplemental stirring and/or external cooling may be necessary to maintain uniform chlorine distribution and to prevent excessive heating. After a suitable period of radiation excess chlorine is purged from the vessel and the product chlorides recovered from the reaction mixtures. Conveniently, the recovery is by fractional distillation since there are usually suitably large differences between the boiling points of hydrocarbons, their monochlor derivatives and their di- or tri-chlor derivatives.

Continuous chlorination may be accomplished by passing a solution of chlorine in the hydrocarbon through a reaction tube exposed to high energy ionizing radiation, separating the formed chlorinated product and recycling unreacted hydrocarbon and chlorine to the reaction tube.

If it is desired to increase the proportion of di- to mono-chlorinated hydrocarbon in the reaction product the mol ratio of chlorine to hydrocarbon in the reaction system may be increased by putting the system under pressure or, more conveniently, by introducing a solvent, such as carbon tetrachloride having a higher solvency for chlorine than the hydrocarbon.

The following examples are illustrative of the process of the invention.

Example I

Cyclohexane (310 g.), in a glass vessel equipped with a gas dispersion tube, is flushed with dry nitrogen for half an hour then saturated with chlorine gas and excess chlorine bubbled through at three liters per hour. The vessel is irradiated with fission product gamma rays for five hours to a total dose of 120,000 rads. After irradiation chlorine is purged from the system with nitrogen and the reaction mass analyzed by gas-liquid partition chromatography. The major product is cyclohexyl chloride with a radiation yield (G-value) of 8100 molecules per 100 electron volts of absorbed energy. Dichlorocyclohexanes are obtained with a total yield of 276 molecules per 100 electron volts.

The product is worked up by fractional distillation at atmospheric pressure. Unreacted cyclohexane distills over at approximately 80° C. and may be recycled to the radiation process if desired. The major chlorinated component is cyclohexyl mono chloride which comes over at 142–143° C. The still residue comprises more highly chlorinated cyclohexane, principally mixed dichloro derivatives. The proportion is so small that their recovery is not justified.

Example II 300 ml. of dodecane are irradiated with fission product gammas for 2.1 hours at an average dose rate of 1.0 megarad per hour while being continuously flushed with excess chlorine gas. 89.7 g. of product are obtained for an overall G value of 924. Gas-liquid partition chromatography indicates three major components comprising 90.3% of the product are monochloro derivatives, the balance being made up of three dichlorocomponents.

Example III 300 ml. of decalin are irradiated as above for 2⅓ hours at 0.9 megarad per hour. 78.9 g. of product are obtained for an overall G value of 816. The product is 97.6% monochloro and 2.4% dichloro derivatives.

Example IV 125 ml. of methyl cyclopentane are irradiated as above for 2.0 hours at 1.1 megarads per hour. 43.2 g. of product art obtained for an overall G value of 1628. GLPC analysis indicates seventeen products ranging in G value from 5 to 697. On a weight basis, the product is 75.0% monochloro, 15.7% dichloro, and 9.3 trichloro derivatives.

Example V

A mixture of cyclohexane (78 g.) and carbon tetrachloride (480 g.) is irradiated as in Example 1. GLPC analysis gives the following products and yields: chlorocyclohexane, G=1260; dichlorocyclohexanes, G=138.

What is claimed is:

1. A process for preparing chlorinated derivatives of a hydrocarbon selected from the group consisting of aliphatic and cycloaliphatic saturated hydrocarbons which comprises subjecting a dispersion of chlorine in said hydrocarbon, in liquid phase, to high energy ionizing radiation.

2. A process for preparing cyclohexyl monochloride which comprises subjecting a dispersion of chlorine in liquid cyclohexane to high energy ionizing radiation and recovering cyclohexyl monochloride from the resulting reaction product by fractional distillation.

3. A process for preparing cyclohexyl monochloride and cyclohexyl dichloride which comprises subjecting a dispersion of chlorine in a liquid solution of cyclohexane in carbon tetrachloride to high energy ionizing radiation and recovering cyclohexyl monochloride and cyclohexyl dichloride from the resulting reaction product by fractional distillation.

4. A process for preparing chlorinated derivatives of a hydrocarbon selected from the group consisting of aliphatic and cycloaliphatic saturated hydrocarbons which comprises subjecting a dispersion of chlorine in said hydrocarbon, in liquid phase, to from $5 \times 10^4$ to $10^8$ rads of high energy ionizing radiation.

5. A process for preparing cyclohexyl monochloride which comprises subjecting a dispersion of chlorine in liquid cyclohexane to from $5 \times 10^4$ to $10^8$ rads of high energy ionizing radiation and recovering cyclohexyl monochloride from the resulting reaction product by fractional distillation.

References Cited

UNITED STATES PATENTS

| | | | |
|---|---|---|---|
| 2,948,667 | 8/1960 | Limido et al. | 204—163 |
| 2,998,459 | 8/1961 | Baker et al. | 260—650 |
| 2,688,592 | 8/1954 | Skeeters et al. | 204—163 |
| 2,849,499 | 8/1958 | McBee et al. | 204—163 |

OTHER REFERENCES

Chemical and Engineering News, vol. 33, No. 14 (Apr. 4, 1955), pp. 1425 and 1428.

Bovey, Effects of Ionizing Radiation on Natural and Synthetic High Polymers (1958), pp. 2, 16 and 17.

HOWARD S. WILLIAMS, *Primary Examiner.*

JOHN H. MACK, *Examiner.*